C. G. CLEMENT.
PINTLE HOOK FOR TRAILER COUPLINGS.
APPLICATION FILED OCT. 22, 1919.
1,408,501.
Patented Mar. 7, 1922.
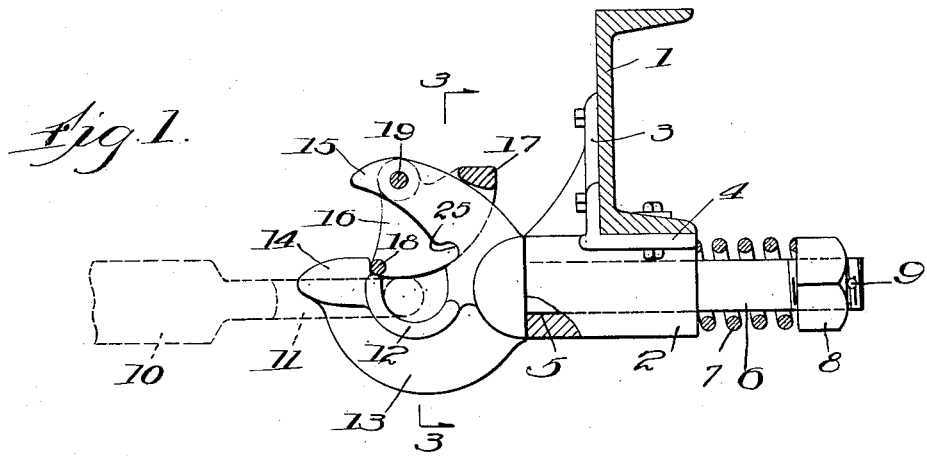
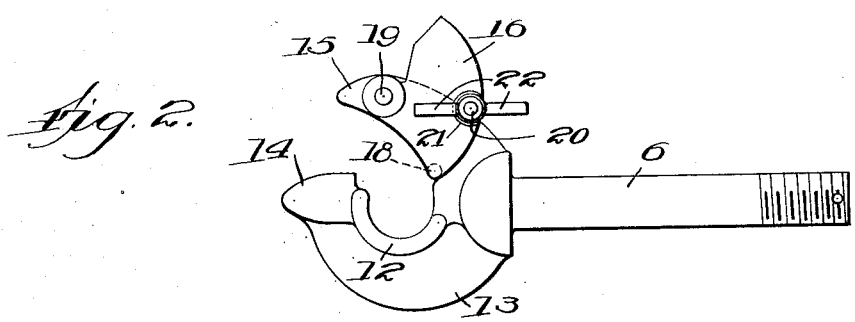
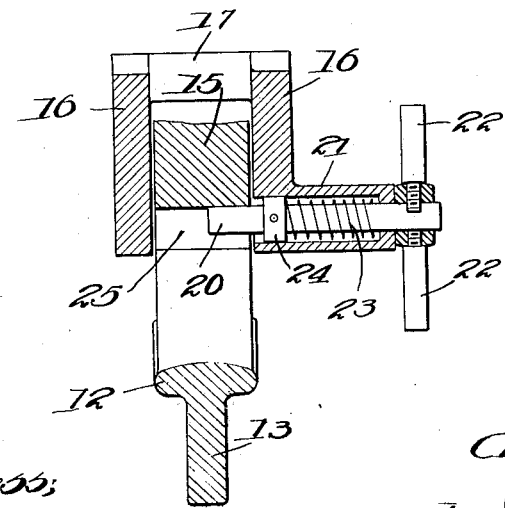

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

PINTLE HOOK FOR TRAILER COUPLINGS.

1,408,501.   Specification of Letters Patent.   Patented Mar. 7, 1922.

Application filed October 22, 1919. Serial No. 332,361.

*To all whom it may concern:*

Be it known that I, CHARLES G. CLEMENT, a citizen of the United States, and a resident of Edgerton, in the county of Rock and State of Wisconsin, have invented certain new and useful Improvements in Pintle Hooks for Trailer Couplings, of which the following is a specification, reference being had to the accompanying drawings, forming a part thereof.

The purpose of this invention is to provide an improved pintle hook to be applied to a tractor vehicle and serve for coupling a trailer thereto. It consists in the features and elements described and shown in the drawings as indicated by the claims.

In the drawings:

Figure 1 is a side elevation, partly in section, showing a pintle hook embodying this invention applied to the rear frame member of a tractor vehicle.

Figure 2 is a side elevation of the hook shown in Figure 1 removed from its mounting and with its latch member in open position.

Figure 3 is a detail section taken as indicated at line, 3—3, on Figure 1, and including the catch device shown in Figure 2.

The pintle hook which is the subject of this invention is especially designed to be applied to a motor truck to serve for convenient attachment of a trailer vehicle thereto, and as shown in Figure 1, it is secured to a frame member, 1, by means of a sleeve or tubular mounting member, 2, provided with flanges, 3 and 4, which are applied to the web and lower flange of the member, 1, respectively, and secured thereto by suitable bolts or screws. Within the bore, 5, of the mounting sleeve, 2, the shank, 6, of the pintle hook is slidably carried with a cushion spring, 7, coiled around it near one end and stopped between one end of the mounting, 2, and a nut, 8, screwed onto the end of the shank, 6, and secured if desired by a cotter pin at 9.

The draw bar or draft pole, 10, with which this hook is designed to co-operate is provided simply with a terminal eye, 11, which normally lodges in the cradle-shaped flange, 12, which constitutes the principal portion of the hook and which is reinforced by a heavy rib, 13, terminating in a nose portion, 14, at one end and extending upwardly and forward in an overhanging horn or arm, 15, as shown in Figures 1 and 2. To insure retention of the eye, 11, by the hook, it is provided with a bifurcated latch member, 16, which straddles the horn, 15, the two lateral portions, 16, of the latch being transversely connected by portions, 17 and 18, and being approximately segmental in form with pivot bosses at the apex engaging the pivot, 19, which extends through the horn, 15.

The swinging movement of the latch member upon this pivot, 19, is limited in its closed position by contact of the cross member, 18, with the rear face of the nose portion, 14, as shown in Figure 1, or by engagement of cross member, 17, of the latch with the upper surface of the nose or arm, 15, it being immaterial which cross member actually serves as the stop. The latch is retained in such closed position by means of a plunger pin, 20, serving as a catch or lock member, and slidably mounted in a socket, 21, formed integrally with the latch member, 16, at one side. The lock is provided with handles, 22, for withdrawing it against the pressure of a coiled spring, 23, pocketed in the socket, 21, and reacting against a flange or collar, 24, on the plunger, 20. In locking position the inner end of the plunger engages in a notch, 25, formed on the under side of the horn, 15, but when withdrawn from such engagement, the latch member, 16, may be swung upwardly about its pivot, 19, until stopped by engagement of the cross portion, 18, in the notch, 25, at which position the locking plunger, 20, if released, will project across the top or back of the arm, 15, and hold the latch member up in this position as shown in Figure 2, thus considerably facilitating the operation of coupling the trailer to the tractor vehicle, and permitting the operator to use both hands in manipulating the draw bar, 10, if necessary, instead of being compelled to hold the latch, 16, out of the way while steering the eye, 11, over the nose, 14, of the hook.

I claim:—

1. In a pintle hook, the combination of an upwardly open hook member provided with on overhanging arm and a bifurcated latch member straddling the overhanging arm pivoted thereon, the two lateral portions of said latch being connected by a transverse portion which traverses the opening of the hook in the swing of the latch upon its pivot, and stops against one side or the other of said hook at fully open and fully closed positions of the latch member respectively.

2. In a pintle hook, the combination of an upwardly open hook member provided with an overhanging arm and a latch member pivoted on said arm to swing across the opening of the hook; stop means for limiting such swing of the latch member at fully open and fully closed positions, and a catch member carried on the latch in position to engage one face or the opposite face of the overhanging arm at fully open and fully closed positions of the latch respectively.

3. In a pintle hook, the combination of an upwardly open hook member provided with an overhanging arm and a bifurcated latch member comprising two segmental portions pivoted at opposite sides of said arm and depending therefrom with a transverse portion connecting their forward corners, in position to traverse the opening of the hook in the swing of the latch upon its pivotal mounting, and to stop against the forward portion of the hook in closed position of the latch, the forward face of the rear portion of said hook at its junction with the overhanging arm having a notch to receive said transverse portion of the latch to permit the latter swinging clear of the opening of the hook while limiting said swing of the latch.

In testimony whereof, I have hereunto set my hand at Edgerton, Wis., this 14th day of October, 1919.

CHARLES G. CLEMENT.